United States Patent [19]
Enk et al.

[11] Patent Number: 5,450,920
[45] Date of Patent: Sep. 19, 1995

[54] METHOD OF OPERATING A MOTOR VEHICLE AND THE MOTOR VEHICLE DRIVE

[75] Inventors: Karl-Georg Enk, Schweinfurt; Walter Fichtler, Hassfurt; Wolfgang Thieler, Hassfurt-Uchenhofen; Bernd Gaubitz, Niederwerrn; Hans-Jürgen Schneider, Werneck-Stettbach, all of Germany

[73] Assignee: Fichtel & Sachs AG, Schweinfurt, Germany

[21] Appl. No.: 212,958

[22] Filed: Mar. 15, 1994

[30] Foreign Application Priority Data

Mar. 16, 1993 [DE] Germany .................. 43 08 327

[51] Int. Cl.⁶ .............. B60R 25/00; B60R 25/04; B60K 23/02
[52] U.S. Cl. .................. 180/287; 307/10.2
[58] Field of Search .............. 180/287; 307/10.2

[56] References Cited

U.S. PATENT DOCUMENTS

| | | | |
|---|---|---|---|
| 4,509,625 | 4/1985 | Tellert | 477/86 |
| 5,079,435 | 1/1992 | Tanaka | 180/287 |
| 5,101,926 | 4/1992 | Berman et al. | 180/287 |
| 5,194,756 | 3/1993 | Darbesio | 180/287 |

FOREIGN PATENT DOCUMENTS 3028250 3/1982 Germany .

*Primary Examiner*—Kenneth R. Rice
*Attorney, Agent, or Firm*—Nils H. Ljungman & Associates

[57] ABSTRACT

A method for operating a motor vehicle driven by an internal combustion engine, and having a drive train for receiving mechanical power of the engine and imparting motion to the motor vehicle via at least one set of wheels of the motor vehicle, can include a system for engaging and disengaging at least a part of the drive train. This system for engaging and disengaging can be utilized for preventing the motor vehicle from being driven under its own power.

15 Claims, 3 Drawing Sheets

METHOD OF OPERATING A MOTOR VEHICLE AND THE MOTOR VEHICLE DRIVE

BACKGROUND OF THE INVENTION

1. Field of the Invention

This invention generally relates to method for operating a motor vehicle driven by an internal combustion engine. In a motor vehicle generating mechanical power with an internal combustion engine, the engine can be considered to be the first element of a drive train for imparting motion to the motor vehicle via at least one set of wheels of the motor vehicle. The wheels of the motor vehicle are generally connected to a corresponding drive shaft, and along with the engine there can typically be a corresponding transmission system for transmitting the power generated by the engine to the drive shaft. The transmission can typically provide a number of gearing ratios for transmitting the power, and a system for engaging and disengaging the various gears therein.

2. Background Information

In motor vehicles, the general mode of operation is via an internal combustion engine that is typically used for generating the mechanical power needed to move the vehicle. However, an internal combustion engine alone develops little power or torque at low rpm, and an increase in engine speed is necessary before the vehicle can move. At the high engine speeds, it however becomes very difficult to engage the rapidly rotating engine drive with the stationary drive shaft. If one were to attempt such an engagement, the engagement would be very violent and could damage parts of the drive train.

In order to smooth out the engagement, as discussed above, several additional operative parts are needed. One of these parts is the transmission which provides a means for changing the ratio between the engine rpm and the rpm of the driven wheels. The transmission essentially makes it possible to get smooth starts and have power to pass and climb hills, while also allowing the engine to operate at reduced rpm at higher vehicle speeds. Another essential part of the drive train of the motor vehicle is the clutch, or commonly a friction clutch, which allows for a gradual application of the load from the rotating engine shaft to the stationary gearing of the transmission and drive shaft. Engagement of the engine and transmission provides the necessary linkup of engine and drivetrain that permits power to the driving wheels, while disengagement provides the necessary halt to power transfer that allows the engine to operate while the transmission does not.

To simplify operation, automated clutch activation devices have been developed for motor vehicles. Such an activation device can generally have an activation device for moving the clutch into and out of engagement, a control device for activating the activation device, and sensors connected to the control device for monitoring certain operating conditions of the moving vehicle.

OBJECT OF THE INVENTION

The object of the present invention is to provide a motor vehicle with an arrangement for operating the clutch activation device in response to user entered signals to thereby either engage the clutch if an appropriate signal is received or provide a theft deterrent by making the vehicle unable to move under its own power if an incorrect signal, or no signal is received. It is also preferable that the already existing parts of the automated clutch activation device, and of the motor vehicle in general, be used for this purpose, thereby requiring essentially few additional components.

SUMMARY OF THE INVENTION

The invention teaches that this object can be achieved by providing a system having a start/shift clutch with an activation device, a control device to activate the activation device, and sensors which are connected to the control device to monitor certain operating conditions of the vehicle, wherein the control device preferably has at least a first input to receive a locking signal and at least an additional input to receive an unlocking signal. With such an arrangement, after a locking signal has been recorded, an attempt to start the vehicle can be determined to be inadmissible unless an unlocking signal has also been received. Thus, if an unlocking signal is not received, the activation device can be activated by the control device such that the clutch is moved into the open, or disengaged position.

By the addition of an input to receive a locking signal and an input to receive an unlocking signal, it is possible to activate the activation device by means of the control device, so that when unauthorized operation is attempted, the clutch is moved into the open (disengaged) state. Unauthorized operation can occur, for example, when a locking signal was recorded, and an attempt is made to start the vehicle without an unlocking signal having been given. As a result of the movement of the clutch into the open state, it is not possible to move the motor vehicle under its own power. Thus the automated clutch activation device can also be used as an anti-theft device, without having to make major modifications.

It is also conceivable that the locking signal could be used to move the clutch into the open, or disengaged position, thereby leaving the drive shaft disengaged from the engine when not in use. With such an alternative configuration, the unlocking signal would thereby re-engage the clutch, and make the vehicle movable under its own power.

In accordance with an additional characteristic, the present invention teaches that the control device can also preferably interrupt the ignition system of the internal combustion engine. A combination of open clutch and ignition interruption can be very reliable in offering extensive protection against potential unauthorized operation and vandalism.

In accordance with an additional characteristic, the invention teaches that the inputs for the locking signal and the inputs for the unlocking signal can also preferably be connected respectively to door lock sensors, whereby unlocking of the door can also simultaneously unlock the clutch activation device for normal clutch operation, and locking of the door can put the control device into a ready state to thereby disengage the clutch if an unlocking signal is not first received when attempting to start the motor vehicle. The use of door lock sensors can be particularly advantageous, to the extent that the activation of the door lock to both unlock and lock the door by the driver is integrated into the altogether normal sequence of events of operating a motor vehicle. The user of the motor vehicle therefore does not need to perform any additional manual interventions to secure his vehicle. It is thereby unimportant whether the door lock sensor is designed as a simple switch or whether it includes a machine-readable code.

The present invention also teaches that if a central locking system is present, i.e., possibly a system for locking every vehicle door simultaneously from a single location, the inputs for the locking and unlocking signals of the clutch activation device can then each also be connected to the electronic control system of the central locking system for locking and unlocking the vehicle doors. Such a combination is characterized in particular by the fact that the electronics integrated into the central locking system can be used to emit a control signal, whereby no additional contacts need to be installed in the door locks. Such a device also offers a particularly high degree of protection against unauthorized operation and vandalism.

In accordance with an additional configuration of the invention, it may be advantageous to connect the inputs for the locking and unlocking signal to a separate key sensor. With such a separate key sensor, a particularly high degree of protection can be achieved against unauthorized operation and vandalism. This key sensor can, for example, possibly be incorporated into the ignition lock, whereby the locking or unlocking process can then occur automatically when the key is inserted into or removed from the ignition lock. It can also be possible to locate the key sensor in a separate location from the ignition key sensor, so that the ignition key or a separate key can be used to give a separate locking or unlocking signal.

The invention also teaches that the input for the locking signal can preferably be connected to the ignition lock sensor. The ignition lock sensor can thereby, in the simplest case, indicate the neutral position of the ignition lock. This type for the generation of the locking signal is particularly simple and economical. Thus, if one does not possess the proper key to start the vehicle via the ignition switch, the clutch can be moved into the open position.

In accordance with an additional characterizing feature, the invention teaches that the input for the unlocking signal can also be connected to a separate input sensor. For example, such a system can include a manual code input, which, when the correct code is input, generates the unlocking signal. This device offers a high degree of protection against unauthorized operation and vandalism.

In summary, one aspect of the invention resides broadly in a method for operating a drive train of a motor vehicle, the drive train comprising an engine for generating mechanical power to move the motor vehicle, wheels for being driven by the mechanical power generated by the engine, a drive shaft for receiving the mechanical power of the engine and transmitting the mechanical power to the drive wheels to move the motor vehicle, apparatus for engaging and disengaging at least a part of the drive train to respectively engage and disengage the engine from the wheels, control apparatus for controlling engagement and disengagement of the apparatus for engaging and disengaging, apparatus for locking the control apparatus, the control apparatus in the locked configuration comprising apparatus for activating the apparatus for engaging and disengaging to disengage the at least a part of the drive train to prevent mechanical power from the engine from driving the wheels, and apparatus for unlocking the control apparatus, the control apparatus in the unlocked configuration comprising apparatus for permitting engagement of the at least a part of the drive train to permit mechanical power from the engine to drive the wheels. The method comprises the steps of: providing the engine for generating mechanical power; providing the wheels for being driven by the engine; providing the drive shaft for receiving the mechanical power of the engine and transmitting the mechanical power to the drive wheels; and providing the apparatus for engaging and disengaging for engaging and disengaging the at least a part of the drive train; providing the control apparatus for controlling engagement and disengagement of the apparatus for engaging and disengaging; providing the apparatus for locking the control apparatus to configure the control apparatus for activating the apparatus for engaging and disengaging to disengage the at least a part of the drive train; providing the apparatus for unlocking the control apparatus to permit engagement of the at least a part of the drive train; locking the control apparatus to configure the control apparatus to disengage the at least a part of the drive train and prevent an unauthorized user from moving the motor vehicle with the mechanical power generated by the engine; and unlocking the control apparatus to permit engagement of the at least a part of the drive train to enable an authorized user to operate the motor vehicle under the mechanical power generated by the engine of the motor vehicle.

A further aspect of the invention resides broadly in a drive train in a motor vehicle, the drive train comprising: an engine for generating mechanical power to move the motor vehicle; wheels for being driven by the mechanical power generated by the engine; a drive shaft for receiving the mechanical power of the engine and transmitting the mechanical power to the drive wheels to move the motor vehicle; a transmission connecting the engine to the drive shaft; and apparatus for engaging and disengaging at least a part of the drive train to respectively engage and disengage the engine from the wheels; control apparatus for controlling engagement and disengagement of the apparatus for engaging and disengaging. The control apparatus comprises: apparatus for locking the control apparatus, the control apparatus in the locked configuration comprising apparatus for activating the apparatus for engaging and disengaging to disengage the at least a part of the drive train and prevent mechanical power from the engine from driving the wheels; and apparatus for unlocking the control apparatus, the control apparatus in the unlocked configuration comprising apparatus for permitting engagement of the at least a part of the drive train to permit mechanical power from the engine to drive the wheels.

Another aspect of the invention resides broadly in a device for actuation of the clutch in a motor vehicle having an engine and a clutch. The motor vehicle has wheels for being driven by the engine, and the actuation device comprises: sensor apparatus for monitoring an operating condition of the motor vehicle; an actuation element for engaging and disengaging the clutch to respectively engage the engine with the wheels and disengage the engine from the wheels; control apparatus for receiving signals from the sensor apparatus and activating the actuation element to engage and disengage the clutch; apparatus for locking the control apparatus, the control apparatus in the locked configuration comprising apparatus for activating the actuation element to disengage the clutch upon an attempt to start the motor vehicle; and apparatus for unlocking the control apparatus, the control apparatus in the unlocked configuration comprising apparatus for permitting the clutch to engage upon starting and using the motor vehicle.

BRIEF DESCRIPTION OF THE DRAWINGS

The invention is explained below in greater detail with reference to the accompanying drawings, in which.

DESCRIPTION OF THE PREFERRED EMBODIMENTS

Figure 1:
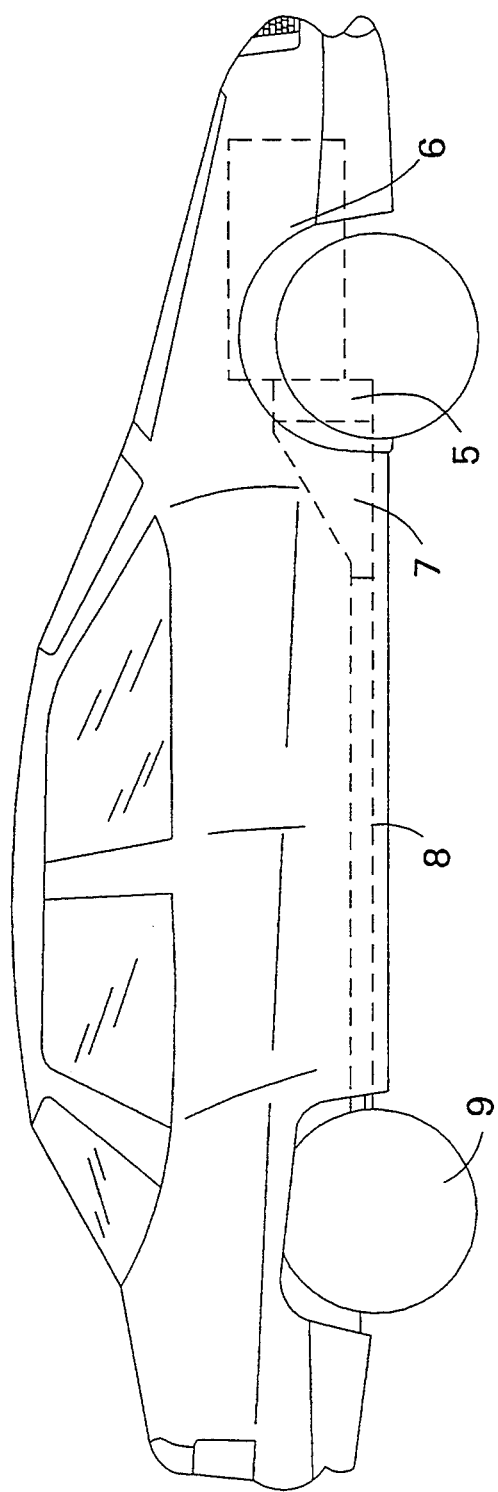
FIG. 1 is a typical motor vehicle with a drive train indicated in schematic.

FIG. 1 shows what could be considered to be a typical automobile having a rear wheel drive. Such an automobile will generally have an internal combustion engine 6' mounted in a forward portion thereof. The automobile will also have a transmission 7' and a drive shaft 8' for transmitting mechanical power generated by the engine 6' to the rear wheels 9'. Further, if the transmission 7' is a manual transmission, the drive train will also generally have a clutch 5' for engaging the engine with the transmission. As discussed previously, it is also known to provide an automatic clutch activation system for engaging and disengaging the clutch. One schematic embodiment for a clutch activation system is shown in FIG. 2.

Figure 2:
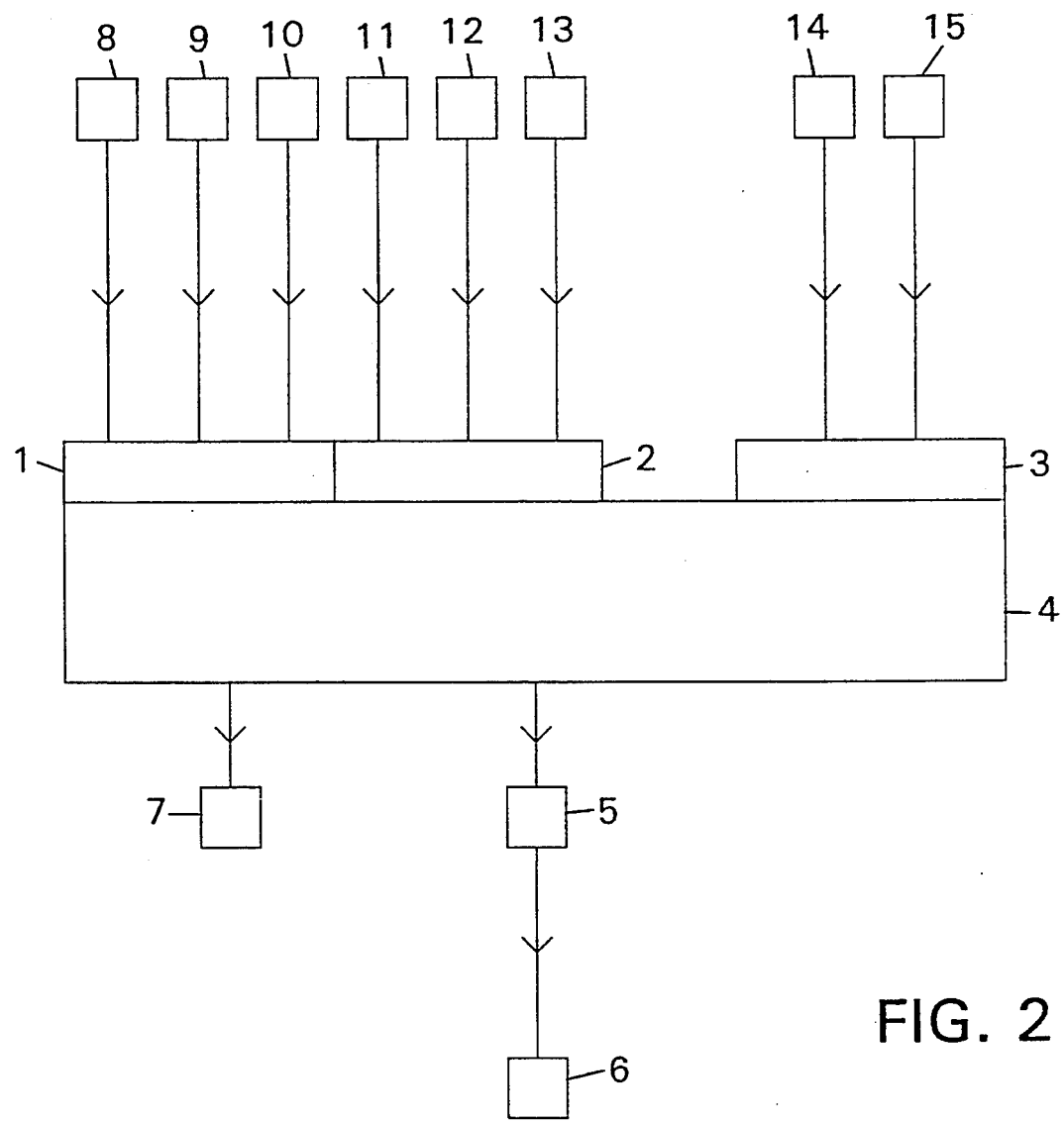
FIG. 2 shows a schematic illustration of a system for automatically engaging and disengaging the drive of a motor vehicle.

The schematic diagram illustrated in FIG. 2, shows the interconnection of the individual components of an automatic clutch activation system. The control device 4 is present as part of the automated clutch activation device. In this embodiment of FIG. 2, the control device 4 can preferably be connected to an activation device 5 which, for its part, can be connected in turn to the start/shift clutch 6. The activation device 5 can thereby have mechanical or hydraulic components which can shift the clutch 6 into either limit position, that is an engaged position, or a disengaged position. The control device 4 can have an input 3 which can preferably be connected to operating condition sensors 15. Such operating condition sensors 15 can be speed sensors, for example. The input 3 in this case can also be equipped with a starting sensor 14. This starting sensor 14 can let the control device 4 know when an attempt has been made to start the vehicle, and, upon detection of such an attempt to start the vehicle. if a correct actuation code is not received, the control device can move the clutch into a disengaged state and thereby prevent movement of the vehicle.

The control device 4 can also be equipped with an input 1 which can preferably be designed to receive locking signals, and can also be equipped with an input 2 which can preferably be designed to receive unlocking signals. Each of these inputs 1 and 2 can preferably be connected to at least one sensor 8, 9, 10 and 11, 12, 13, respectively, which sensors can in turn preferably be connected to key locks, etc., or devices which provide a locking function. The control device 4 can also be connected to the ignition device 7 of the internal combustion engine, to control the engine. One such method of engine control would be to interrupt the ignition.

The sensors connected to the input 1 can preferably be at least one of: a door lock sensor 8, a key sensor 9, and/or an ignition lock sensor 10. The sensors connected to input 2 can preferably be at least one of: a door lock sensor 11, a key sensor 12, and/or an input sensor 13. While there are numerous possible combinations of the above input sensors, several particularly advantageous combinations of these input sensors 8 to 13 are described below.

When door lock sensors 8 and 11 are used for the locking and unlocking signal, the system can be very easy to operate, and can offer a high degree of protection against unauthorized operation and vandalism. If there is already a central locking system in the vehicle, the automated clutch activation device with anti-theft protection can be installed very economically, and can comprise a part of the central locking system. In such a configuration, an unlocking signal can essentially be used to unlock, or free the clutch for normal use, while a locking signal can put the control device into a configuration to disengage the clutch upon an attempt to start the vehicle if an unlocking signal is not first received. Thus, when an operator unlocks a door of the vehicle, the unlocking signal which electronically opens the door locks can also be used to unlock the control devices. Similarly, when the operator is finished driving, upon locking the doors, when exiting the motor vehicle, the locking signal can be used to lock the control device. With such a system, it would be advantageous to have a lock override on the control device if the vehicle is already running, thereby preventing a disengagement of the clutch while under power.

When a key sensor 9 or 12 is used for the two inputs 1 and 2 respectively, a coded signal can be used, which coded signal can be automatically read when the ignition key is removed or inserted into the ignition lock. Thus, if one does not have the key to fit the ignition lock, the clutch will be disengaged upon an attempt to start the vehicle, wherein, on the other hand, if a key is inserted into the ignition, the control can be deactivated to allow for free operation of the clutch. Similarly, when the ignition key is removed from the ignition lock, a locking signal can be provided which locks the control device. Such a device can be particularly easy for the driver to use, and is thus accepted very easily, and it also offers a high degree of protection against unauthorized operation and vandalism.

It may also be advantageous, however, to use an ignition lock sensor 10 for the input 1 and a key sensor 12 for the input 2. The key sensor 12 can thereby be polled both in the ignition lock and in a separate location. Such a combination can offer particular security against unauthorized operation.

Instead of the combination described above, it can also be possible to equip the input 2 with a separate input sensor 13, by means of which the unlocking signal can be input manually, for example. One such device would be a device for inputting a multi-digit code, which device upon receipt of the correct code could then signal the control device 4 to operate as needed. This system has the same advantages as indicated above.

It is of course also possible to connect a theft alarm to the control device 4. This theft alarm can, in the conventional manner, send a signal to the vehicle horn, but it can also activate other noise-making devices, or the vehicles headlights and tail-lights. If the theft alarm is provided with device to detect a break-in, i.e. glass breakage detectors, it could also be possible to connect the theft alarm directly to one of the inputs of the control device to move the clutch into a disengaged position upon detection of a break-in, thereby preventing movement of the vehicle under its own power.

Figure 3:
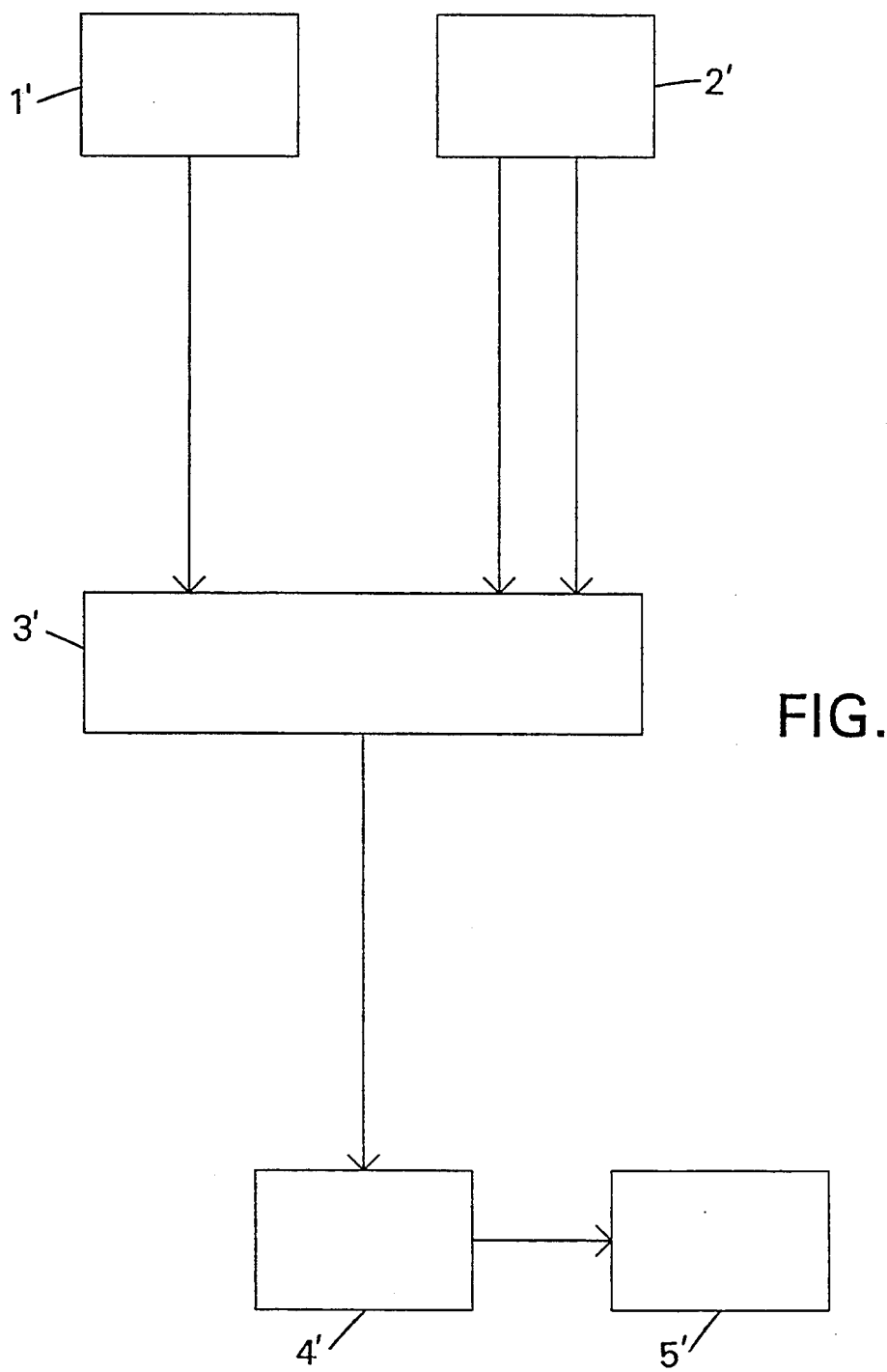
FIG. 3 shows an additional schematic illustration of an alternative automatic drive activation system.

In the depicted arrangement as shown in FIG. 3, a control device 3', in particular an electronic control device, can be connected to the clutch 5, by means of an activation device 4,. The activation device 4, can preferably be configured to engage and disengage the clutch in accordance with the signal received from at least the control device 3'. Such an activation device can operate purely mechanically, or it can also be hydraulically assisted, for example, to move the clutch between the engaged and disengaged positions.

The control device 3' can preferably be connected to sensors 2' which monitor engine or vehicle data, for example. The activation device 4' of the clutch can preferably be operated as appropriate on the basis of these data. The control device 3' can also be connected to a coding device 1', by means of which the inputs into the control device can be made. If the vehicle user has the correct code, he can input the correct code into the control device 3' by means of the coding device 1', and the control device can activate the clutch in the desired manner. But if the coding device 1' is given the incorrect code, the control device 3' can preferably activate the activation device 4' of the clutch 5', so that the clutch remains in the open position and thus a disengaged state. This condition can then remain in effect until the correct code is input via the coding device 1'.

If an incorrect code is input, or if no code is input, the vehicle will essentially not be able to move under its own power, since the force transmission connection between the engine and transmission is interrupted by the disengaged clutch.

One feature of the invention resides broadly in an automated clutch activation device in a motor vehicle powered by an internal combustion engine, comprising a start/shift clutch with an activation device, a control device to activate the activation device, and sensors which are connected to the control device to monitor certain operating conditions, characterized by the fact that the control device 4 has an input 1 to receive a locking signal and an input 2 to receive an unlocking signal, so that after a locking signal has been recorded, an attempt to start the vehicle is determined to be inadmissible unless an unlocking signal has also been received, and the activation device 5 is activated by the control device 4 such that the clutch 6 is moved into the open (disengaged) position.

Another feature of the invention resides broadly in the clutch activation, characterized by the fact that the control device 4 also interrupts the ignition device 7 of the internal combustion engine.

Still another feature of the invention resides broadly in the clutch activation, characterized by the fact that the inputs 1, 2 for locking and unlocking signals are each connected to respective door lock sensors 8, 11.

Yet another feature of the invention resides broadly in the clutch activation, whereby a central locking system is integrated into the vehicle, characterized by the fact that the inputs 1, 2 for the locking and unlocking signals are each connected to the electronic control system of the central locking system.

Another feature of the invention resides broadly in the clutch activation, characterized by the fact that the inputs 1, 2 for the locking and unlocking signals are connected to a separate key sensor 9, 12.

Still another feature of the invention resides broadly in the clutch activation, characterized by the fact that the input 1 for the locking signal is connected to an ignition lock sensor 14.

Yet still another feature of the invention resides broadly in the clutch activation, characterized by the fact that the input 2 for the unlocking signal is connected to a separate input sensor 13.

A further feature of an alternative embodiment of the present invention resides broadly in the automatic clutch activation device in a motor vehicle driven by an internal combustion engine, comprising a starter/clutch with an activation device, a control device to activate the activation device, and sensors which are connected to the control device to monitor certain operating conditions, characterized by the fact that there is a device 1 to detect an authorized or unauthorized use of the vehicle, which is connected to the control device 3 such that when an incorrect code is entered, the clutch 5 is placed in the disengaged position.

Another feature of the alternative embodiment of the invention resides broadly in the clutch activation device, characterized by the fact that the device comprises a coding device 1 with a multi-digit numerical code.

One type of known automated clutch activation device is disclosed, for example, in German Patent No. 3 028 250, which corresponds to U.S. Pat. No. 4,509,625. In this known arrangement there is a control device which is connected to sensors to activate the activation device. The sensors monitor certain operating conditions of the vehicle or of the drive train, and on the basis of the signals from these sensors, the control device can automatically activate the clutch in response to the driver's wishes, to start the vehicle or to change gears.

Other examples of clutch activation devices are disclosed in U.S. Pat. Nos. 4,971,183 and 4,854,433, both of which were issued to Rudy Tellert, and 4,434,879 to Lutz et al.

Some additional examples of friction clutches, clutch activation devices, and related accessories can be found in the following U.S. Pat. Nos. 4,343,387 issued in August 1982 to Hofbauer; 4,331,226 issued in May 1982 to Heidermeyer et al.; 4,295,551 issued in October 1981 to Zimmerman et al.; 4,208,929 issued in June 1980 to Heino et al.; 4,081,065 issued in March of 1978 to Smyth et al.; 4,023,660 issued in May of 1977 to Dickinson; and 4,019,614 issued in April of 1977 to Prenzel et al.

Some examples of anti-theft systems for motor vehicles which deter movement of the motor vehicle can be found in the following U.S. Pat. Nos. 5,090,223 to Ruffler, entitled "Car Theft Deterrent to Deflate Tires"; 4,818,029 to Mourot and Dana entitled "Vehicle Anti-Theft Device Making at Least One Wheel Unserviceable, and a Wheel Comprising the Device"; and 4,678,068 to Matthews et al. entitled "Automobile Brake Locking System".

Some additional anti-theft devices that are operated by means of inputting a code by a key pad are disclosed in the following U.S. Pat. Nos. 5,023,591 to Edwards, entitled "Anti-Theft Control Apparatus"; 4,742,327 to Burgess and Kaufman entitled "Keyless Access Control and Security System"; and 4,463,340 to Adkins and Frantz, entitled "Anti-Theft Control System".

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if any, described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. P 43 08 327, filed on Mar. 16, 1993, having inventors Karl-Georg Enk, Walter Fichtler, Wolfgang Thieler, Bernd Baubitz, and Hans-Jürgen Schneider, and DE-OS P 43 08 327 and DE-PS P 43 08 327, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A method for operating a drive train of a motor vehicle, the motor vehicle having a plurality of doors, each of the plurality of doors comprising door lock means for locking each of the plurality of doors in a locked configuration and unlocking at least one door from the locked configuration, the vehicle also comprises a central locking system for substantially simultaneously operating each of said door lock means of each of said plurality of doors, the drive train comprising an engine for generating mechanical power to move the motor vehicle, wheels for being driven by the mechanical power generated by the engine, a drive shaft for receiving the mechanical power of the engine and transmitting the mechanical power to the drive wheels to move the motor vehicle, means for engaging and disengaging at least a part of the drive train to respectively engage and disengage the engine from the wheels, said means for engaging and disengaging at least a part of the drive train comprises clutch means for respectively engaging and disengaging the engine from the wheels, control means for controlling engagement and disengagement of the means for engaging and disengaging, said control means further comprises sensor means for sensing an attempt to start the vehicle, means for locking said control means, said control means in said locked configuration comprising means for activating said means for engaging and disengaging to disengage the at least a part of the drive train to prevent mechanical power from the engine from driving the wheels, said means for locking said control means comprises: means for producing a first lock signal upon activation of one of said door lock means to substantially simultaneously lock said doors, and means for receiving said first lock signal to lock said control means, and means for unlocking said control means, said control means in said unlocked configuration comprising means for permitting engagement of the at least a part of the drive train to permit mechanical power from the engine to drive the wheels, said means for unlocking said control means comprises: means for producing a second unlock signal upon activation of said door lock means to substantially simultaneously unlock said doors, and means for receiving said second unlock signal to unlock said control means, said means for producing a first lock signal and said means for producing a second unlock signal comprise door lock sensors for respectively determining a locking and an unlocking of the at least one door to respectively lock and unlock the control means, and the vehicle also comprises means for connecting said central locking system to said sensor means for producing said first lock signal and said second unlock signal to respectively lock and unlock said control means substantially simultaneously with said locking and unlocking the plurality of doors, and said method comprising the steps of:

providing the engine for generating mechanical power;

providing the wheels for being driven by the engine;

providing the drive shaft for receiving the mechanical power of the engine and transmitting the mechanical power to the drive wheels; and providing said means for engaging and disengaging for engaging and disengaging said at least a part of the drive train;

providing said control means for controlling engagement and disengagement of the means for engaging and disengaging;

providing said means for locking said control means to configure said control means for activating said means for engaging and disengaging to disengage the at least a part of the drive train;

providing said means for unlocking said control means to permit engagement of the at least a part of the drive train;

substantially simultaneously locking each of the plurality of doors, and thereby, during said substantially simultaneous locking:

producing said first lock signal; and receiving said first lock signal to lock said control means;

locking said control means to configure said control means to disengage the at least a part of the drive train and prevent an unauthorized user from moving the motor vehicle with the mechanical power generated by the engine;

disengaging the clutch means upon sensing an attempt to start the motor vehicle with the control means in the locked configuration;

substantially simultaneously unlocking each of the plurality of doors, and thereby, during said substantially simultaneous unlocking:

producing said second unlock signal; and receiving said second unlock signal to unlock said control means; and unlocking said control means to permit engagement of the at least a part of the drive train to enable an authorized user to operate the motor vehicle under the mechanical power generated by the engine of the motor vehicle.

2. The method according to claim 1, wherein: said means for producing a first lock signal and said means for producing a second unlock signal comprise one of:

an ignition key sensor for sensing an ignition key in an ignition lock:

an ignition key sensor for sensing an ignition key at a second lock remote from the ignition lock;

a key sensor for sensing a key different from the ignition key at a third lock remote from the ignition lock; and a code input device with sensor means for sensing a manually entered code at the code input device; and said method further comprises the steps of:

producing said first lock signal by one of:

removing the ignition key from the ignition lock;

inserting the ignition key into the second lock remote from the ignition lock and producing said first lock signal;

inserting the key different from the ignition key in the third lock and producing said first lock signal; and manually inputting a code at said code input device to produce said first lock signal; and producing said second unlock signal by one of:

inserting the ignition key into the ignition lock;

inserting the ignition key into the second lock remote from the ignition lock end producing said second lock signal;

inserting the key different from the ignition key in the third lock and producing said second unlock signal; and manually inputting a code at said code input device to produce said second unlock signal.

3. The motor vehicle according to claim 2, wherein:

the vehicle comprises an ignition circuit for providing electricity to start the engine, said control device further comprises means for interrupting said ignition circuit when said control device is locked, and said method further comprises the step of:
interrupting the ignition circuit upon an attempt to start the vehicle when the control device is locked;

the ignition key comprises an encoded signal and said ignition key sensor comprises means for reading the encoded signal upon insertion of the ignition key into the ignition lock;

said sensor means for sensing a manually entered code comprises a numeric keypad for entering a multi-digit numeric code to produce one of said first and second signal upon at least a first predetermined multi-digit numerical code being input thereon;

said clutch means comprises a friction clutch;

the engine comprises an internal combustion engine;

said means for automatically engaging and disengaging the clutch comprises one of:

hydraulically assisted means for automatically engaging and disengaging the clutch means; and mechanically assisted means for automatically engaging and disengaging the clutch means; and the motor vehicle additionally comprises a theft alarm electronically connected to said control means, said theft alarm comprising at least one of:

means for operating a siren, and means for flashing lights of the vehicle upon an attempt to start the vehicle with the control means locked, and said method further comprises the steps of:

operating a siren upon an attempt to start the motor vehicle with said control means locked; and flashing lights of the vehicle upon an attempt to start the vehicle with the control means locked.

4. In a motor vehicle having at least one door, the at least one door comprising door lock means for locking the at least one door in a locked configuration and unlocking the at least one door from the locked configuration, a drive train comprising:

an engine for generating mechanical power to move the motor vehicle;

wheels for being driven by the mechanical power generated by the engine;

a drive shaft for receiving the mechanical power of the engine and transmitting the mechanical power to the drive wheels to move the motor vehicle;

a transmission connecting the engine to the drive shaft;

means for engaging and disengaging at least a part of the drive train to respectively engage and disengage the engine from the wheels;

control means for controlling engagement and disengagement of the means for engaging and disengaging;

said control means comprising:

means for locking said control means, said control means in said locked configuration comprising means for activating said means for engaging and disengaging to disengage the at least a part of the drive train and prevent mechanical power from the engine from driving the wheels, said means for locking said control means comprising:

means for producing a first lock signal upon activation of said means for locking said control means; and means for receiving said first lock signal to lock said control means; and means for unlocking said control means, said control means in said unlocked configuration comprising means for permitting engagement of the at least a part of the drive train to permit mechanical power from the engine to drive the wheels, said means for unlocking said control means comprises:

means for producing a second unlock signal upon activation of said means for unlocking said control means; and means for receiving said second unlock signal to unlock said control means; and said means for producing a first lock signal and said means for producing a second unlock signal comprise door lock sensors for respectively determining a locking and an unlocking of the at least one door to respectively lock and unlock the control means.

5. The drive train in accordance with claim 4, wherein:

the vehicle has an ignition circuit for providing electricity to start the engine;

said means for engaging and disengaging at least a part of the drive train comprises clutch means for respectively engaging and disengaging the engine from the wheels;

said control means further comprises:

sensor means for sensing an attempt to start the vehicle; and means for interrupting said ignition circuit when said control device is locked and an attempt to start the vehicle is detected.

6. The drive train according to claim 5, further comprising:
- a plurality of doors, each of said plurality of doors comprising door lock means;
- a central locking system for substantially simultaneously operating each of said door lock means of each of said plurality of doors;
- said central locking system comprising second control means for controlling operation of said central locking system;
- said second control means comprises said means for producing the first lock signal and the means for producing the second unlock signal; and
- means for connecting said second control means to said means for receiving said first lock signal and said means for receiving said second unlock signal to respectively lock and unlock said control means substantially simultaneously with said locking and unlocking the plurality of doors.

7. The motor vehicle according to claim 4, wherein:
- said means for locking said control means comprise:
  - means for producing a first lock signal upon activation of said means for locking said control means; and
  - means for receiving said first lock signal to lock said control means;
- said means for unlocking said control means comprises:
  - means for producing a second unlock signal upon activation of said means for unlocking said control means; and
  - means for receiving said second unlock signal to unlock said control means;
- said means for producing a first lock signal and said means for producing a second unlock signal comprise one of:
  - an ignition key sensor for sensing an ignition key in an ignition lock:
  - an ignition key sensor for sensing an ignition key at a location remote from the ignition lock;
  - a key sensor for sensing a key different from the ignition key; and
  - sensor means for sensing a manually entered code.

8. The motor vehicle according to claim 7, wherein:
- the vehicle has an ignition circuit for providing electricity to start the engine, and said control device further comprises means for interrupting said ignition circuit when said control device is locked;
- the ignition key comprises an encoded signal and said ignition key sensor comprises means for reading the encoded signal; and
- said sensor means for sensing a manually entered code comprises a numeric keypad for entering a multi-digit numeric code to produce one of said first and second signal upon at least a first predetermined multi-digit numerical code being input thereon.

9. The motor vehicle according to claim 8, wherein:
- said clutch means comprises a friction clutch;
- the engine comprises an internal combustion engine;
- said means for automatically engaging and disengaging the clutch comprises one of:
  - hydraulically assisted means for automatically engaging and disengaging the clutch means; and
  - mechanically assisted means for automatically engaging and disengaging the clutch means; and
- the motor vehicle additionally comprises a theft alarm electronically connected to said control means, said theft alarm comprising at least one of:
  - means for operating a siren, and
  - means for flashing lights of the vehicle upon an attempt to start the vehicle with the control means locked.

10. For a motor vehicle having an engine and a clutch, a device for actuation of the clutch, the motor vehicle having wheels for being driven by the engine, an ignition circuit for providing electricity to start the engine, and at least one door, the at least one door comprising door lock means for locking the at least one door in a locked configuration and unlocking the at least one door from the locked configuration, and said actuation device comprising:
- sensor means for monitoring an operating condition of the motor vehicle;
- an actuation element for engaging and disengaging the clutch to respectively engage the engine with the wheels and disengage the engine from the wheels;
- control means for receiving signals from said sensor means and activating the actuation element to engage and disengage the clutch;
- means for locking said control means, said control means in said locked configuration comprising means for activating the actuation element to disengage the clutch upon an attempt to start the motor vehicle, said means for locking said control means comprise:
  - means for producing a first lock signal upon activation of said means for locking said control means; and
  - means for receiving said first lock signal to lock said control means;
- means for unlocking said control means, said control means in said unlocked configuration comprising means for permitting the clutch to engage upon starting and using the motor vehicle, said means for unlocking said control means comprises:
  - means for producing a second unlock signal upon activation of said means for unlocking said control means; and
  - means for receiving said second unlock signal to unlock said control means;
- said means for producing a first lock signal and said means for producing a second unlock signal comprise door lock sensors for respectively determining a locking and an unlocking of the at least one door to respectively lock and unlock the control means;
- sensor means for sensing an attempt to start the vehicle; and
- means for interrupting said ignition circuit when said control means is locked and an attempt to start the vehicle is detected.

11. The motor vehicle according to claim 10, further comprising:
- a plurality of doors, each of said plurality of doors comprising door lock means;
- a central locking system for substantially simultaneously operating each of said door lock means of said plurality of doors;
- said central locking system comprising second control means for controlling operation of said central locking system;

said second control means comprises said means for producing the first lock signal and the means for producing the second lock signal; and means for connecting said second control means to said means for receiving said first lock signal and said means for receiving said second unlock signal to respectively lock and unlock said control means substantially simultaneously with said locking and unlocking the plurality of doors.

12. For a motor vehicle having an engine and a clutch, a device for actuation of the clutch, the motor vehicle having wheels for being driven by the engine, said actuation device comprising:

sensor means for monitoring an operating condition of the motor vehicle;

an actuation element for engaging and disengaging the clutch to respectively engage the engine with the wheels and disengage the engine from the wheels;

control means for receiving signals from said sensor means and activating the actuation element to engage and disengage the clutch;

means for locking said control means, control means in said locked configuration comprising means for activating the actuation element to disengage the clutch upon an attempt to start the motor vehicle, said means for locking said control means comprise:

means for producing a first lock signal upon activation of said means for locking said control means; and means for receiving said first lock signal to lock said control means;

means for unlocking said control means, said control means in said unlocked configuration comprising means for permitting the clutch to engage upon starting and using the motor vehicle, said means for unlocking said control means comprises:

means for producing a second unlock signal upon activation of said means for unlocking said control means; and means for receiving said second unlock signal to unlock said control means;

said means for producing a first lock signal and said means for producing a second unlock signal comprise one of:

an ignition key sensor for sensing an ignition key in an ignition lock;

an ignition key sensor for sensing an ignition key at a location remote from the ignition lock;

a key sensor for sensing a key different from the ignition key; and sensor means for sensing a manually entered code.

13. The motor vehicle according to claim 12, wherein the vehicle has an ignition circuit for providing electricity to start the engine, and said control device further comprises means for interrupting said ignition circuit when said control device is locked.

14. The motor vehicle according to claim 13, wherein:

the ignition key comprises an encoded signal and said ignition key sensor comprises means for reading the encoded signal; and said sensor means for sensing a manually entered code comprises a numeric keypad for entering a multi-digit numeric code to produce one of said first and second signal upon at least a first predetermined multi-digit numerical code being input thereon.

15. The motor vehicle according to claim 14, wherein:

said clutch means comprises a friction clutch;

the engine comprises an internal combustion engine;

said means for automatically engaging and disengaging the clutch comprises one of:

hydraulically assisted means for automatically engaging and disengaging the clutch means; and mechanically assisted means for automatically engaging and disengaging the clutch means; and the motor vehicle additionally comprises a theft alarm electronically connected to said control means, said theft alarm comprising at least one of:

means for operating a siren, and means for flashing lights of the vehicle upon an attempt to start the vehicle with the control means locked.

* * * * *

UNITED STATES PATENT AND TRADEMARK OFFICE
CERTIFICATE OF CORRECTION

PATENT NO. : 5,450,920

DATED : September 19, 1995

INVENTOR(S) : Karl-Georg ENK, Walter FICHTLER, Wolfgang THIELER, Bernd GAUBITZ, and Hans-Jürgen SCHNEIDER It is certified that error appears in the above-indentified patent and that said Letters Patent is hereby corrected as shown below:

On the title page, item [54], after 'DRIVE' insert --TRAIN THEREFOR--.

In column 1, line 2, after 'DRIVE' insert --TRAIN THEREFOR--.

In column 15, line 23, Claim 12, after the second occurrence of 'means,' insert --said--.

Signed and Sealed this

Nineteenth Day of November, 1996

Attest:

BRUCE LEHMAN

*Attesting Officer*        *Commissioner of Patents and Trademarks*